(12) United States Patent
Kuz et al.

(10) Patent No.: US 9,120,692 B2
(45) Date of Patent: Sep. 1, 2015

(54) MACHINE FOR THE PRODUCTION OF HOLLOW GLASS

(71) Applicant: BOTTERO S.P.A., Cuneo (IT)

(72) Inventors: Zdenko Kuz, Wilen (CH); Maurizio Barolo, Fossano (IT)

(73) Assignee: BOTTERO S.P.A., Cuneo (IT)

( * ) Notice: Subject to any disclaimer, the term of this patent is extended or adjusted under 35 U.S.C. 154(b) by 0 days.

(21) Appl. No.: 14/058,807

(22) Filed: Oct. 21, 2013

(65) Prior Publication Data
US 2014/0109618 A1    Apr. 24, 2014

(30) Foreign Application Priority Data

Oct. 22, 2012 (IT) .............................. MI2012A01792

(51) Int. Cl.
*C03B 11/16* (2006.01)
*C03B 9/193* (2006.01)
*C03B 11/10* (2006.01)

(52) U.S. Cl.
CPC ............... *C03B 11/16* (2013.01); *C03B 9/1932* (2013.01); *C03B 9/1938* (2013.01); *C03B 11/10* (2013.01); *Y10T 29/49716* (2015.01)

(58) Field of Classification Search
USPC ..................... 65/362, 305, 307, 330, 80, 171; 29/401.1
See application file for complete search history.

(56) References Cited

U.S. PATENT DOCUMENTS

| | | | |
|---|---|---|---|
| RE27,153 E | 7/1971 | Donnelly | |
| 5,411,564 A * | 5/1995 | Bolin ............................... | 65/68 |
| 6,397,635 B1 * | 6/2002 | Sasso et al. ..................... | 65/160 |
| 7,340,923 B2 * | 3/2008 | Bogert et al. ................... | 65/362 |
| 2005/0252245 A1 * | 11/2005 | Bogert et al. ................... | 65/362 |
| 2009/0078005 A1 * | 3/2009 | Kirkman ......................... | 65/171 |
| 2010/0018255 A1 * | 1/2010 | Balbi .............................. | 65/246 |

FOREIGN PATENT DOCUMENTS

| | | |
|---|---|---|
| EP | 1681275 A1 | 7/2006 |
| EP | 2145860 A1 | 1/2010 |

OTHER PUBLICATIONS

Italian Search Report and Written Opinion in corresponding application dated Jul. 26, 2013.

* cited by examiner

*Primary Examiner* — Mark Halpern
(74) *Attorney, Agent, or Firm* — Hedman & Costigan, P.C.; James V. Costigan; Kathleen A. Costigan

(57) ABSTRACT

The present invention relates to a system for aligning and positioning a male mechanism-pneumatic or servo-electric- to be used at the blank station side of a section of a hollow glass forming machine. The system comprises a mechanism, comprising at least one plunger or a driving unit driven by a servomotor, a guide flange composed of an internal flange for retaining the mechanism in position, and an external flange. The system further comprises a base plate for supporting the mechanism. The plate is mounted on at least one guide bar, rigidly fixed to the resting face of the external flange and intended to allow the base plate to slide along a sliding direction substantially orthogonal to the plane wherein the external flange lies. The base plate rests on a height adjustment group, suspended to said upper plane and intended to move the plate along the guide.

12 Claims, 13 Drawing Sheets

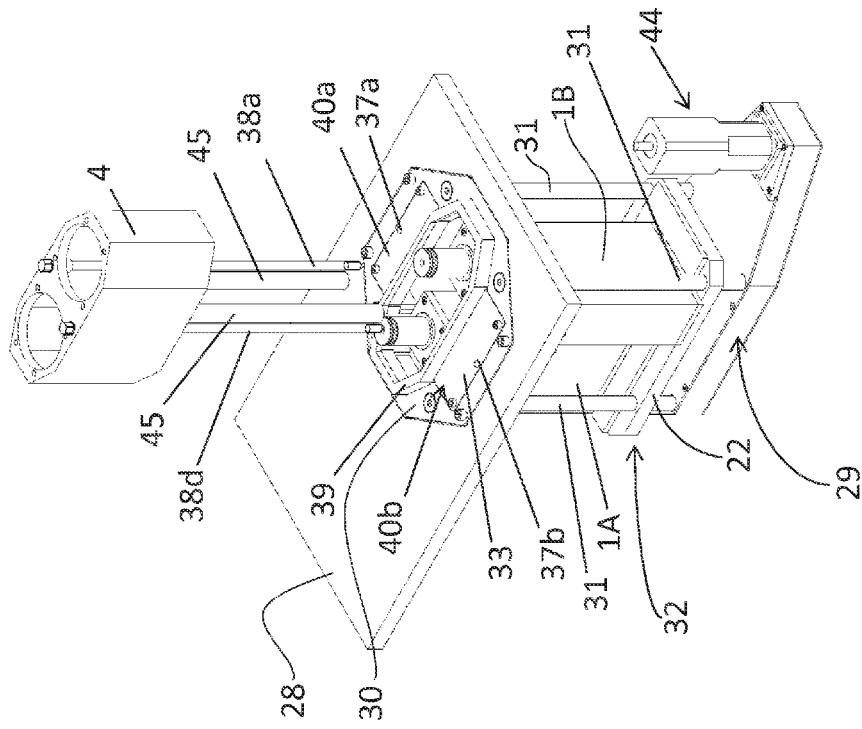
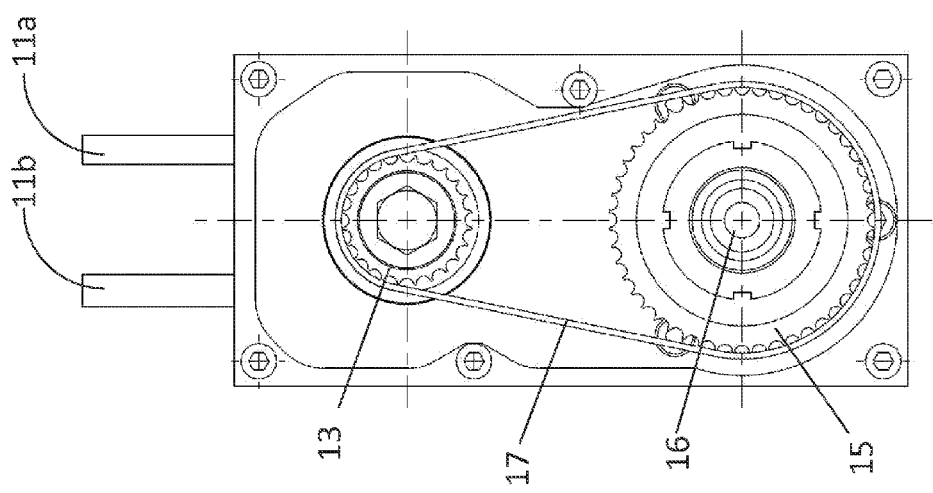
FIG.6
FIG.5

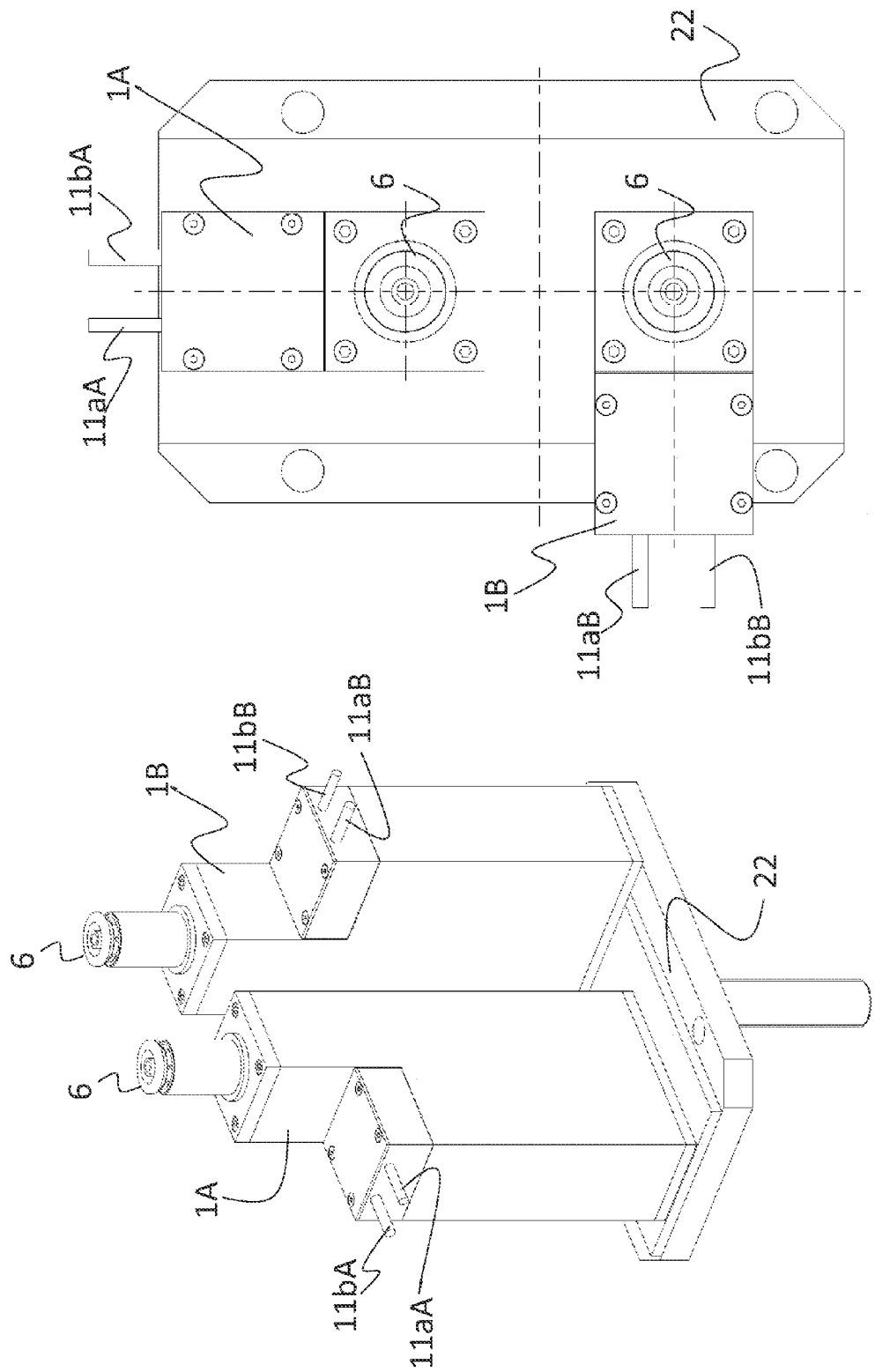

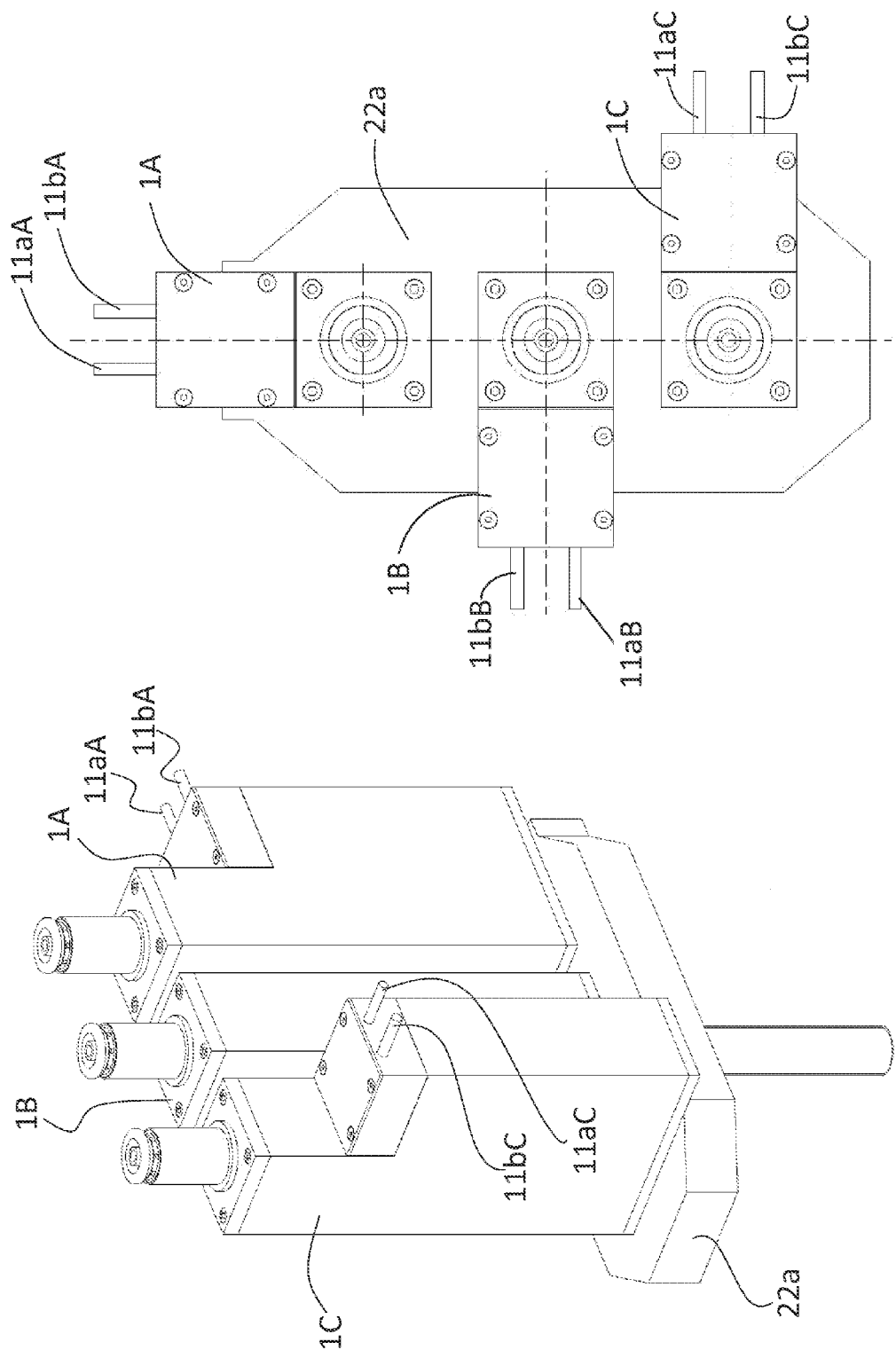

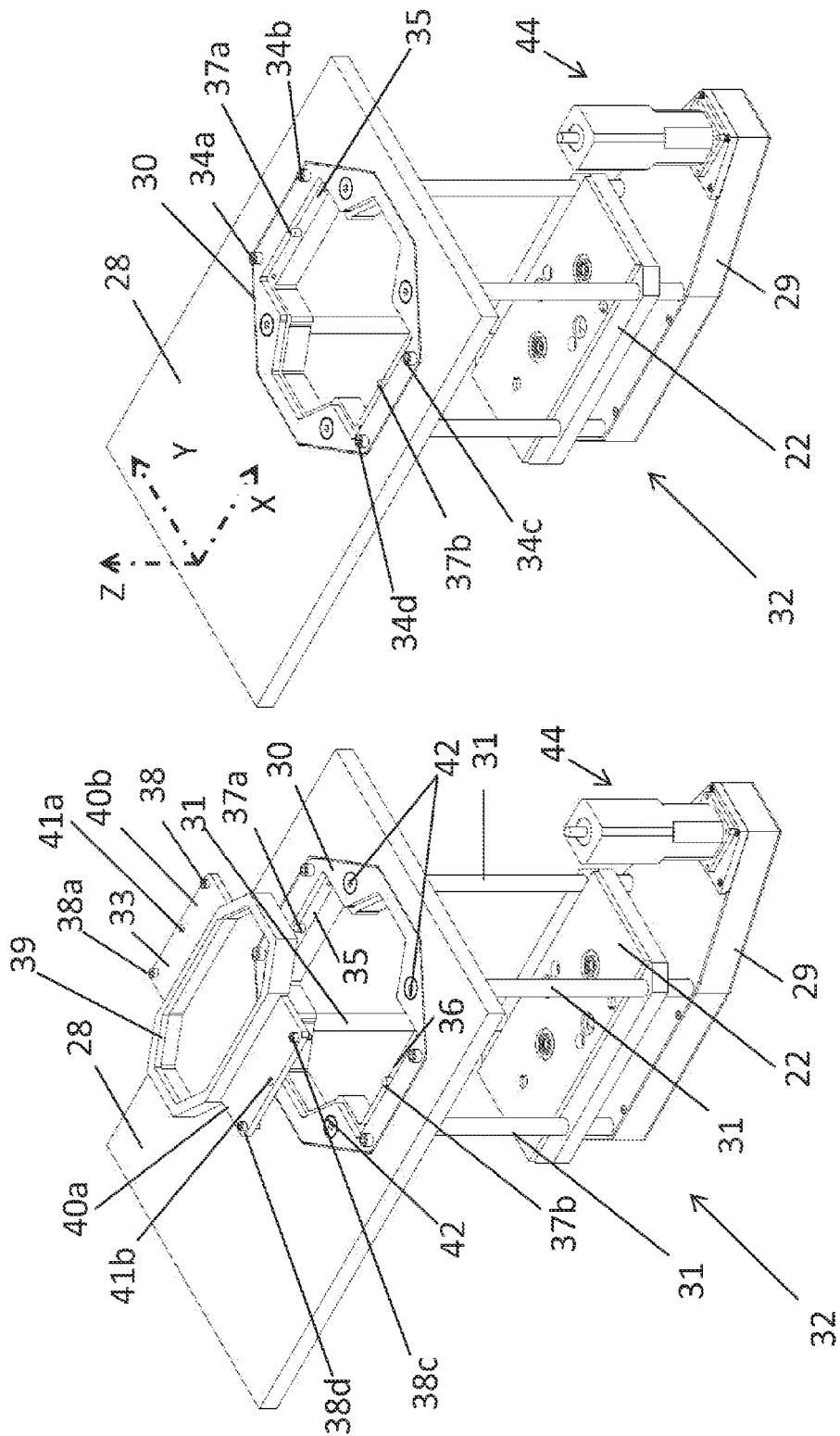

MACHINE FOR THE PRODUCTION OF HOLLOW GLASS

TECHNICAL FIELD

The present invention relates to the field of hollow glass forming machines and more in detail to the field of machines with individual sections, also known as "individual section machines" or more shortly defined by their acronym IS (Individual Section).

More in detail, the present invention relates to a system and a method for aligning and positioning the male mechanism in a section of a IS machine.

The invention further relates to methods for arranging one or more driving units of a servo-electric male mechanism, namely driven by servomotors, such to facilitate the driving units to be mounted from the top inside the section.

PRIOR ART

It is known that hollow glass forming machines can operate by a production technology of the "blow-blow" or "press-blow" type, the difference being in the blank molding process of the glass container formed by the machine.

In IS machines operating with a "press-blow" process, a gob of molten glass is inserted into a blank mold, where a male mechanism, provided with a non perforated and suitably shaped tool called punch, presses the glass gob in order to form a first cavity therein. In the machines operating by a "blow-blow" process, on the contrary, the male mechanism is provided with a perforated punch through which air is blown inside the glass gob, so as to form the parison.

In both the cases, the alignment of the male mechanism, and therefore of its punches, with the respective blank molds and collars therefore is essential for obtaining a container with the desired quality, avoiding defects in the glass distribution; besides reducing frictions and wear between contacting members when mutually sliding (blank molds, collars and punches).

Once forming of the parison ends, a servo-electric or pneumatic driven actuator, known as invert mechanism, transfers the parison from the blank mold to the finishing mold, where a blowing process completes the glass container.

The male mechanism, equipped with one or more pneumatic plungers or with one or more servo-electric driving units, is rested on a base plate of a height adjustment system, in order to adjust the height of the mechanism and to allow articles with different shapes and dimensions to be formed. A wrong adjustment of the base plate, causes the punch to enter too much or too little into the blank mold, and as a consequence the container has not the desired quality. Another critical aspect is to make the axis of the plunger of the male mechanism and the axis of the blank mold coinciding as much as possible, such that the punch enters in the mold perfectly aligned and not tilted, causing frictions and generating flexural stresses on the plunger of the mechanism.

For the good result of the container, therefore it is important that the height adjustment system guarantees the verticality of the male mechanism (and obviously of its punches) and the positioning thereof at the correct distance from the blank molds.

Nowadays it is known to fix the height adjustment system to the lower plate of the housing of one section of a IS machine.

The male mechanism, rested on the base plate, is then guided in its upper part by a guide flange fixed to the upper plate of the housing.

Therefore the male mechanism is positioned by using two elements fixed to the lower plate and to the upper plate of the housing respectively, which are two separated components, or they are part of the single housing component, it being complicated to guarantee them the accuracy during the mechanical processing. Thus the perfect verticality of the mechanism and its alignment with the blank molds and the collars is not guaranteed. The non perfect alignment subjects the shaft or shafts of the male mechanism to flexural stress, generating an early wear of the mechanism or of the equipment.

In order to have access to the housing for maintenance or cleaning operations it is necessary to take the male mechanism out from the section, and then to take out also its guide flange. This latter is the one that guarantees the mechanism to be centered with the blank molds; therefore once the maintenance ends, it is necessary to centre again the male mechanism with the blank molds before the section starts again the production.

An example of the positioning of the male mechanism inside a section of a machine for the production of hollow glass is described in patent applications EP1681275 and WO2004/018371.

OBJECTS AND SUMMARY OF THE INVENTION

It is the object of the present invention to overcome some of the drawbacks of the prior art.

Particularly it is the object of the present invention to provide a system allowing a better verticality and a better alignment of the male mechanism and its punches with respect to blank molds and collars to be guaranteed.

It is also an object of the present invention to make the maintenance of machines for the production of hollow glass more simple and quick, by making the interior of the housing more accessible from the top and by making the assembly and disassembly of the male mechanism inside the housing easier.

These and other objects of the present invention are achieved by a system and method for positioning the male mechanism in a machine for the production of hollow glass, embodying the characteristics of the annexed claims, which are an integral part of the present description.

In order to achieve these objects, the inventors have thought to provide a new system for positioning, guiding and adjusting the height of the male mechanism, to be used at the blank mold side of a section of a hollow glass forming machine.

The system provides to fix all the guide and height adjustment elements for the male mechanism to the upper plate of the housing, to which also the mold opening and closing mechanism is fastened which bears the blank molds and the invert mechanism supporting the collars. It results in a better verticality of the male mechanism and in a better alignment thereof on the blank molds.

The guide flange of the male mechanism is divided into two separated flanges. An outer flange with a resting face intended to rest at least partially on the upper plane of the housing of the section, and fixing means for fixing said external flange to the upper plane. An internal flange, that guides the male mechanism, is fixed to the external one by suitable fixing and centering means. The base plate is slidingly mounted on one or more guides (particularly guide and sliding pins) rigidly fastened to the resting face of the external flange and intended to allow the base plate to slide along a sliding direction substantially orthogonal to the plane wherein the external flange lies. The base plate rests on a height adjustment group, suspended to the upper plane of the housing, and intended to move the base plate along the guide. In a preferred embodiment, the height adjustment group is suspended to the guides.

The guides are positioned in order to be perfectly perpendicular to the surface of the external flange allowing them to rest on the upper plate of the housing, and therefore such to guarantee the perfect parallelism between the external flange and the base plate of the male mechanism. The guides help also in keeping the base plate perfectly parallel to the external flange during the up/down movement for adjusting the height.

When centering the male mechanism on the blank molds, the internal and external flanges are moved as a single assembly, and consequently they move contemporaneously and simultaneously also the height adjustment system and the male mechanism. All the male assembly moves as a single assembly fastened to the upper plate of the housing. There are no more parts that remain fixed to the lower plate of the housing, as previously it occurred in the height adjustment system and in the base plate. It results a better verticality of the mechanism and its alignment on the blank molds.

This solution offers also the advantage of making maintenance operations of the machine more simple and quick in the areas surrounding the male mechanism. When it is necessary to access to the section for maintenance or cleaning purposes through the cavity housing the male mechanism, only the internal guide flange is removed. The fixing and centering means on the external flange, which remains on the housing, allow the proper alignment between the male mechanism and the blank molds not to be lost, and therefore they allow this operation not to be performed again when the production needs to be started again.

In a preferred embodiment the height adjustment group is fixed at one end of the sliding guides, so as to be suspended to the upper plate of the housing of the section by means of the guides and the external flange.

Thus, it is more simple than in the past to take the height adjustment system out from the section, it being possible to take it out as a single block together with the guide flange if it needs maintenance.

It is well known that the male mechanism can be both pneumatic, that is driven by compressed air, or servo-electric, that is driven by electric motors. Preferably the male mechanism comprises at least one pneumatic plunger or a servo-electric driving unit, if single cavity machines are used; or several pneumatic plungers or several driving units if multi-cavity machines are used.

In the case of a servo-electric driving unit, the latter comprises a frame wherein a rod moving the punch and a servomotor intended to allow the rod to move are arranged side by side.

In one embodiment, the frame of the driving unit is divided into two portions extending for different lengths in a linear movement direction of the rod. The portion more extended in this direction houses the rod of the mechanism, while the other one is intended to house the electric servomotor.

As it will be better seen in the description below, this solution allows the driving units to be installed inside the section in a simple and compact manner.

Preferably, the base plate provides centering and fixing means for the driving units, particularly pegs, fixing threads and positioning holes, such that it is easier for the operator to carry out the operation of lowering the several driving units into the section.

This solution allows therefore the driving units to be positioned according to such positions that allow the space taken up inside the section to be reduced.

In a preferred embodiment, the height adjustment group comprises an adjustment screw and a servomotor, coupled with the adjustment screw, for transmitting the movement thereto. The base plate of the male mechanism rests on the screw head and therefore it slides along the guides due to head pushing on the plate.

Even if the invention is particularly focused on the system for positioning the male mechanism, it is clear that the object of the present invention is also a machine for the production of hollow glass, comprising a blank station and a finishing one for a glass container, wherein the blank station comprises a system for positioning the male mechanism incorporating the characteristics described and claimed herein.

Then it is the object of the present invention a method for positioning at least one driving unit of a servo-electric male mechanism in a machine for the production of hollow glass, the machine comprising a housing with a upper plane having an opening at the blank molds, an external flange centrally hollow and fixable at said opening, an internal flange fixable to the external flange and intended to hold in position a male mechanism comprising at least one driving unit, and a base resting plate for at least one driving unit of said mechanism, and a height adjustment group for the base plate. The method provides the steps of:

removing the internal flange,
inserting the driving unit through the external flange and the opening of the upper plane,
positioning the driving unit on the base plate, so that the rod of the mechanism is free to slide through a hole of the internal flange when it is mounted on the external one, and such that at least one part of the frame of the driving unit is under the upper plane externally with respect to the opening of the upper plane,
fixing the internal flange on the external flange.

This method allows the space inside the housing of a hollow glass forming machine to be optimized.

In one embodiment particularly advantageous as regards the space taken up, the driving unit has a L shape and it is composed of two chambers extending for different lengths in the direction of displacement of the mechanism rod. The more elongated portion of the support of the driving unit holds the movable rod of the mechanism, and it has to be placed at the central opening of the guide flange; while the shorter portion holds the motor.

Further objects and advantageous characteristics of the present invention will be more clear from the following description.

BRIEF DESCRIPTION OF THE DRAWINGS

The invention will be described below with reference to non-limiting examples, provided by way of example and not as a limitation in the annexed drawings. These drawings show different aspects and embodiments of the present invention and, where appropriate, reference numerals showing like structures, components, materials and/or elements in different figures are denoted by like reference numerals.

FIGS. 1-5 are different sectional and perspective views of a driving unit of a male mechanism for a IS machine according to the invention.

FIG. 6 is a system for supporting and adjusting the height of a male mechanism in a section of a machine for the production of hollow glass according to the invention.

FIGS. 7-15 are the system of FIG. 6 according to different views and during different steps of positioning the driving units of the male mechanism.

FIGS. 16 and 17 are the positioning of three driving units in a triple-gob variant of the machine of FIG. 6.

FIGS. 22-25 are different views of a system for supporting and adjusting the height of a male mechanism according to the invention.

DETAILED DESCRIPTION OF THE INVENTION

Figure 2:
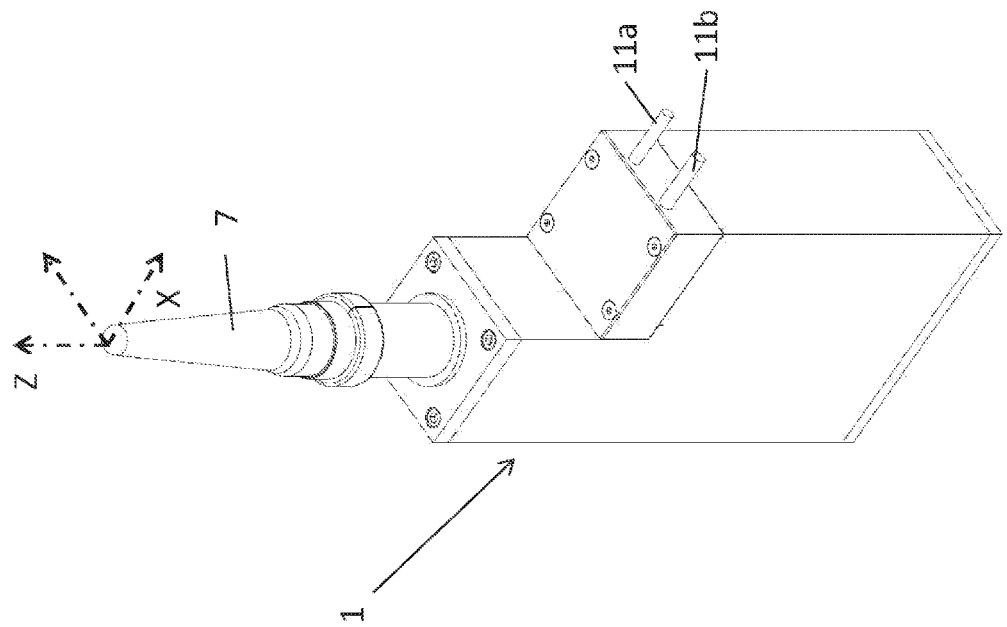
Figure 1:
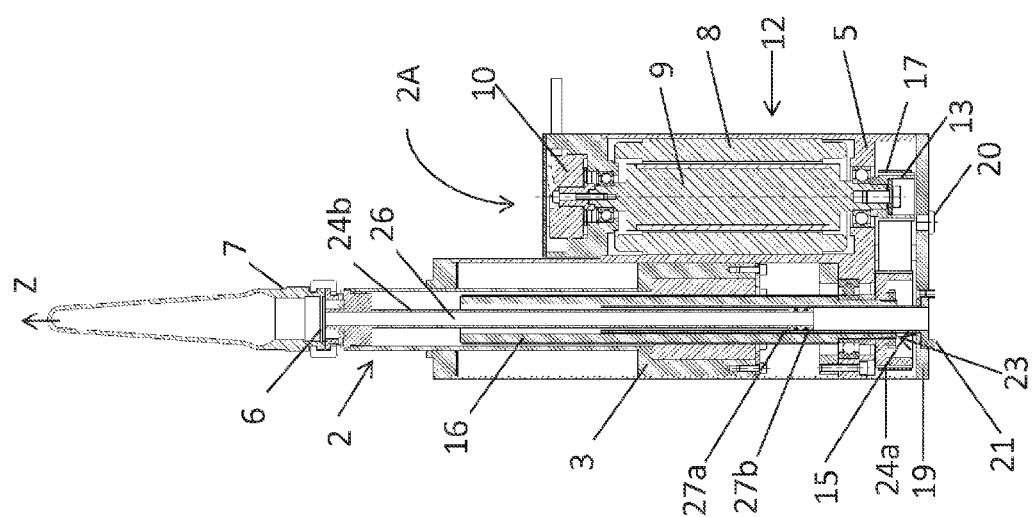
Figure 4:
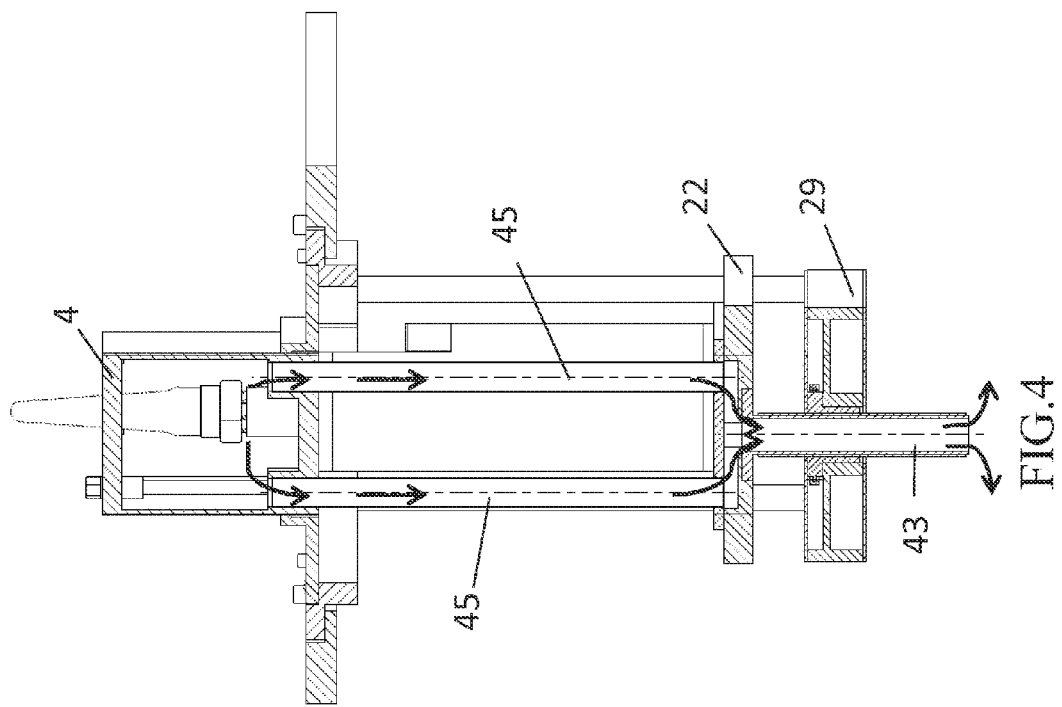
Figure 3:
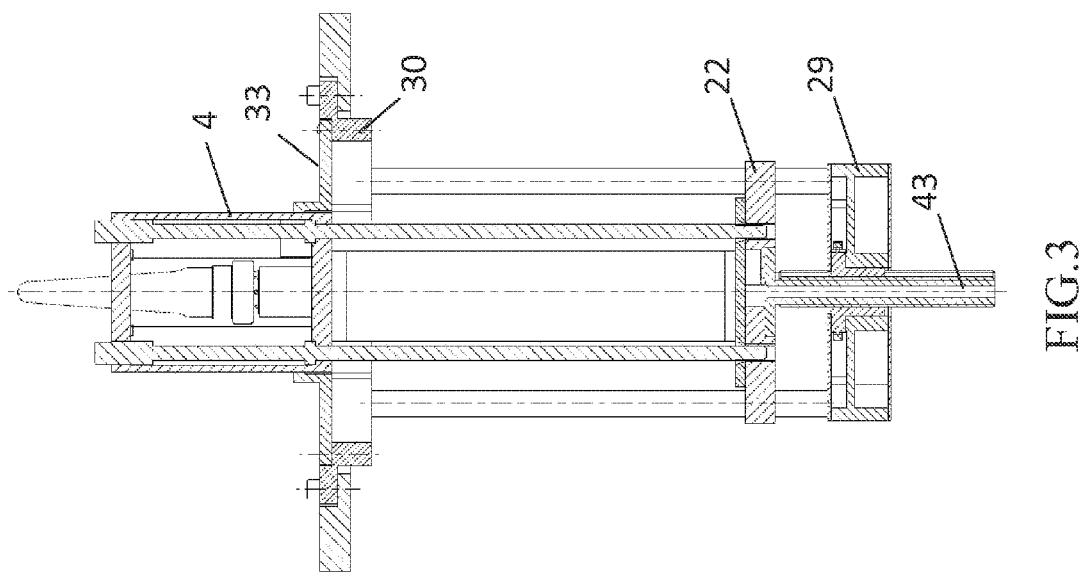
Figure 8:
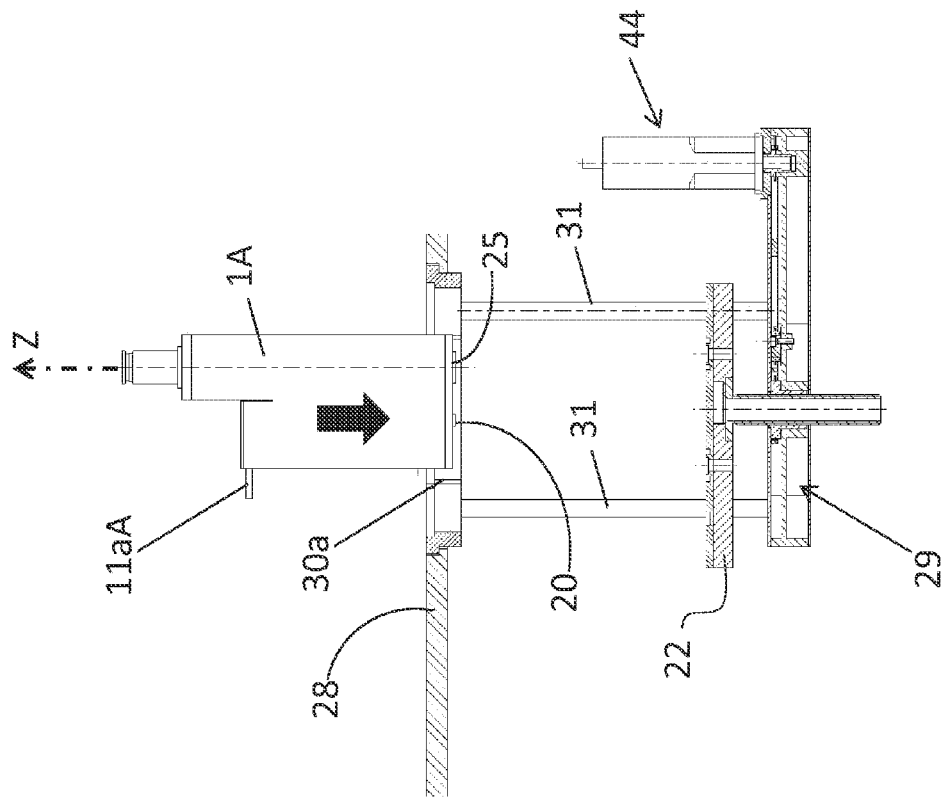
Figure 7:
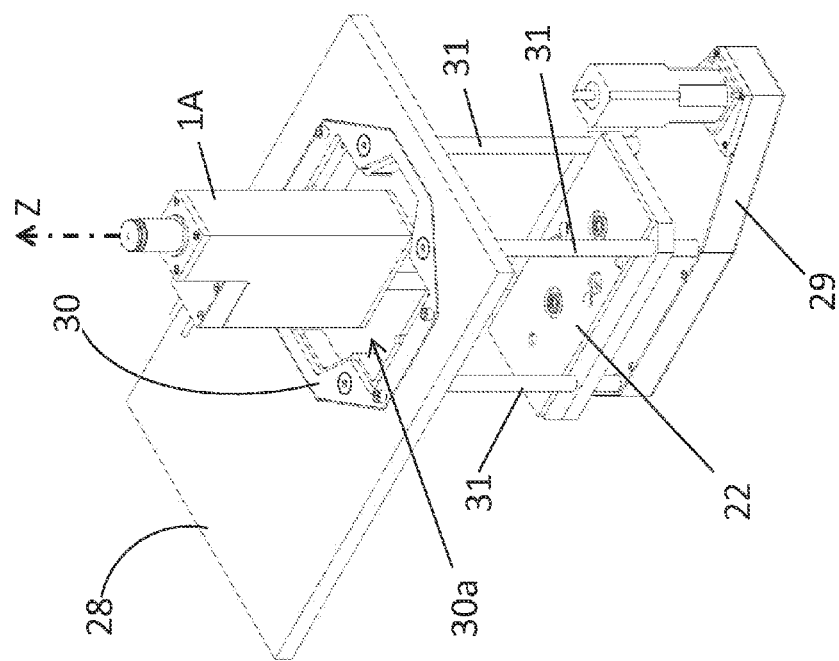
Figure 10:
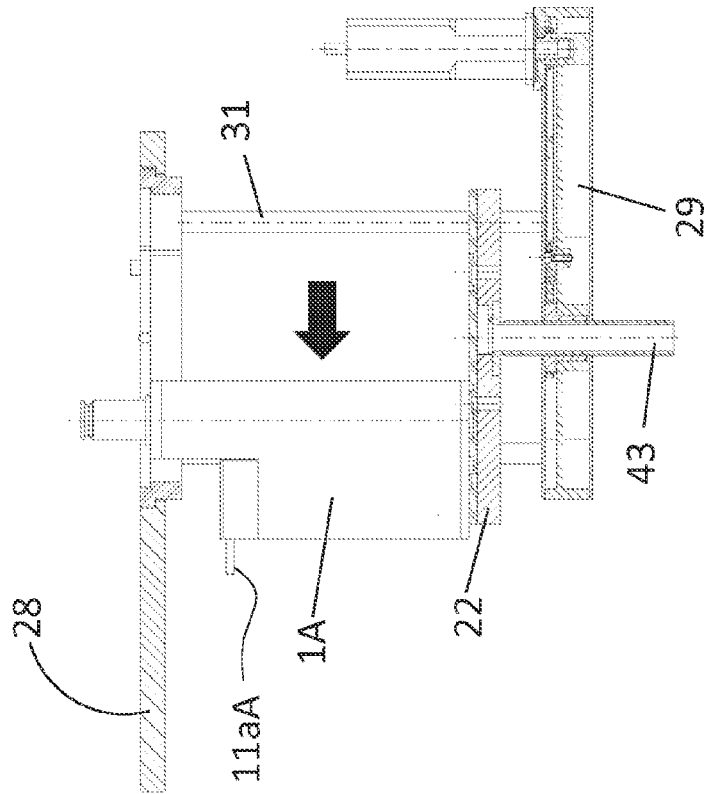
Figure 9:
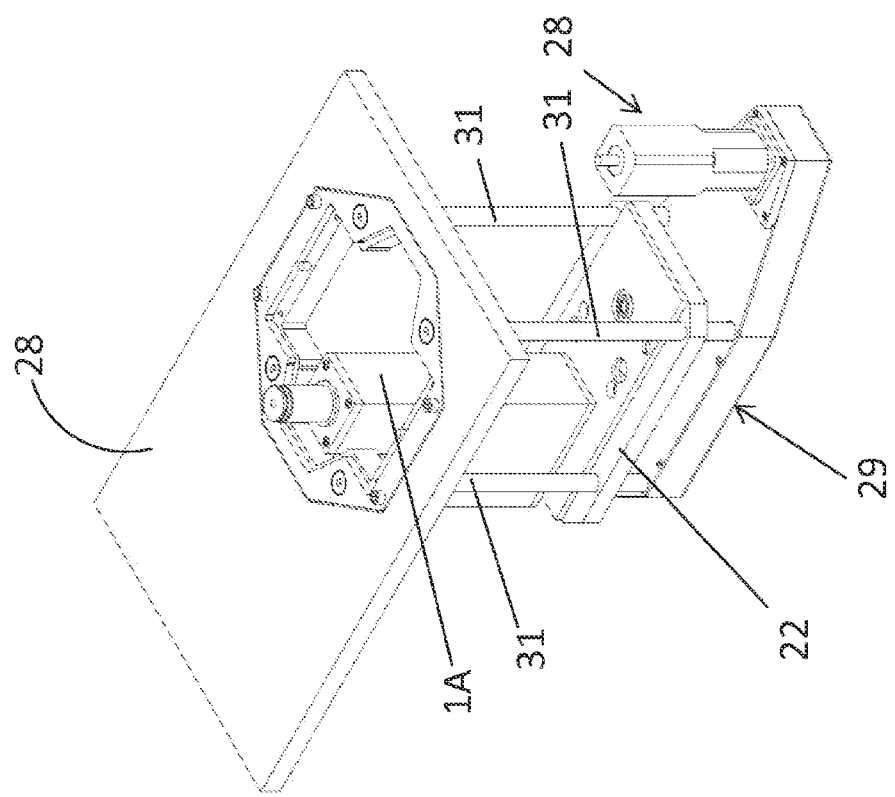
Figure 12:
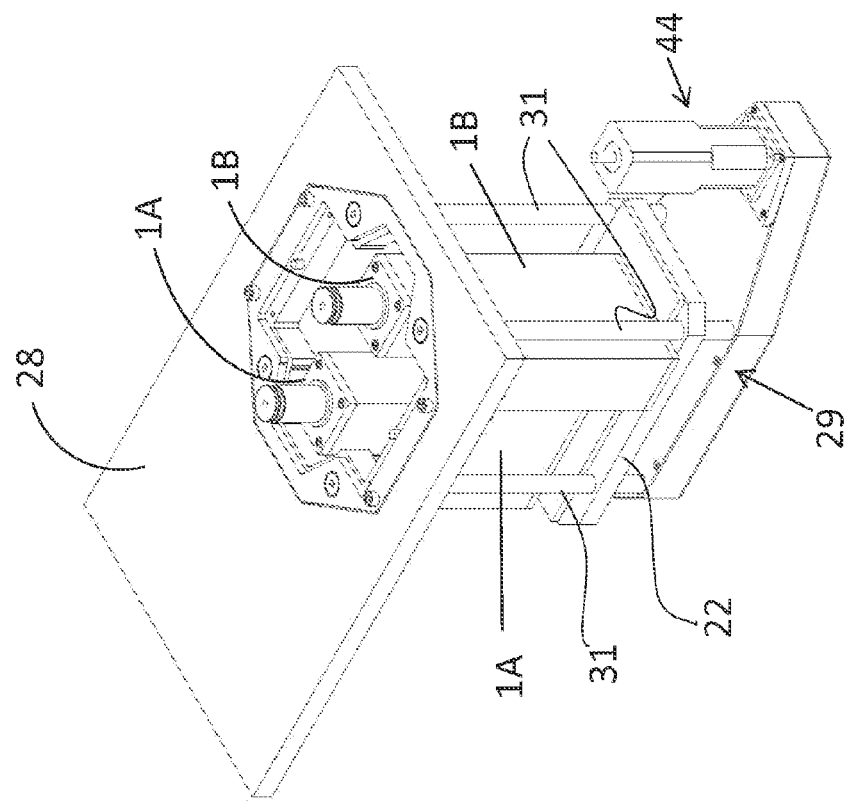
Figure 11:
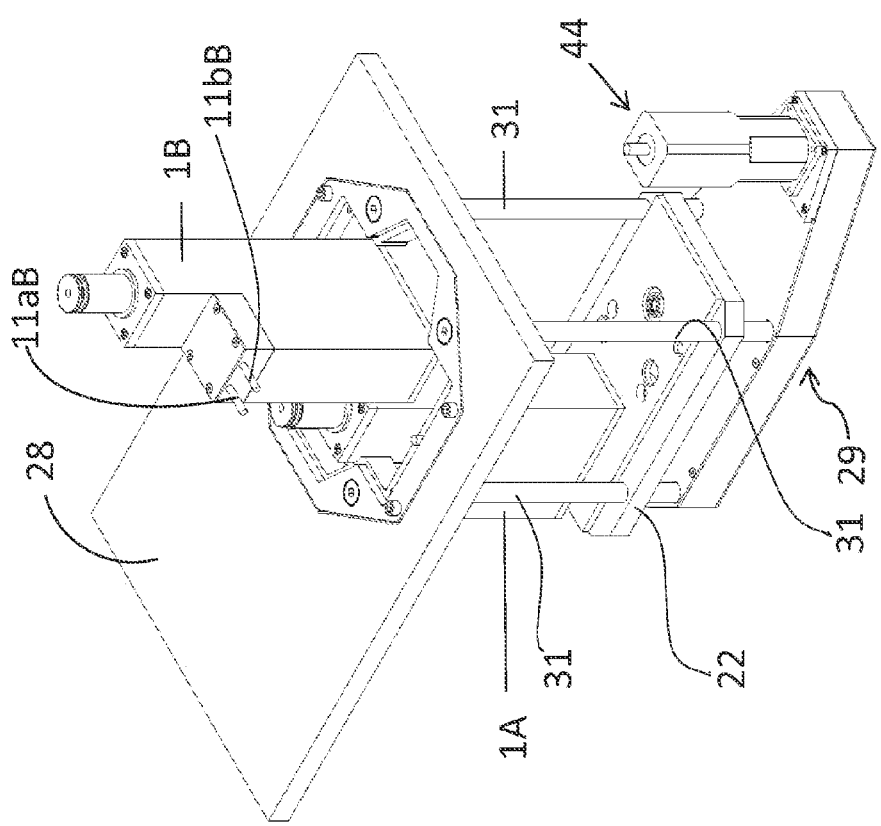
Figure 13:
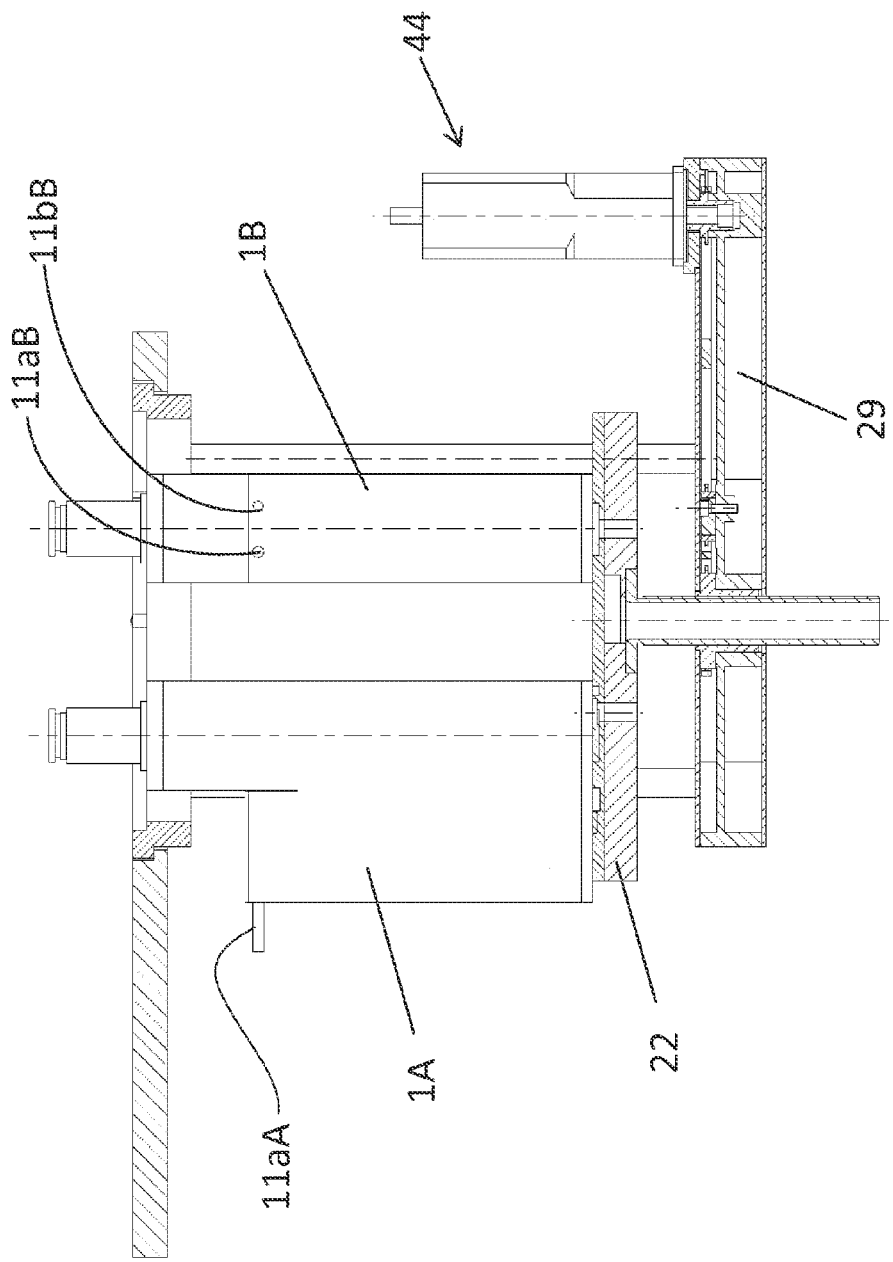

While the invention is susceptible of various modifications and alternative forms, some preferred embodiments are shown in the drawings and will be described below in detail. It should be understood, however, that there is no intention to limit the invention to the specific embodiment disclosed, but, on the contrary, the intention of the invention is to cover all modifications, alternative forms, and equivalents falling within the scope of the invention as defined in the claims.

In the description below and in the figures, like elements are denoted by like reference numerals. The use of "for example", "etc.", "or" indicates non-exclusive alternatives without limitation unless otherwise noted. The use of "including" means "including, but not limited to," unless otherwise noted.

The term "blank station" of a hollow glass forming machine means the assembly of components allowing the blank (parison) of a hollow glass container to be made. Such station therefore comprises one or more blank molds, a delivery system for depositing a glass gob into one or more blank molds, a system for positioning the male mechanism necessary to align it with respect to the mold with which they have to cooperate, and other components known per se.

The term "male mechanism" of a hollow glass forming machine means the mechanism provided with members that are inserted into the blank molds during the blank molding step. Therefore such mechanism comprises one or more plungers with relevant punches and the devices for moving the plunger/plungers.

FIGS. 1 to 5 show, in different views and sections, a preferred embodiment of a driving unit 1 of a male servomechanism, to be used in a hollow glass forming machine.

The driving unit 1 comprises a plunger 2 and an actuator 2A able to move the plunger.

The driving unit 1 is characterized by the fact of having the rod 3 of the plunger 2 placed side by side with an actuator 2A that develops on a direction parallel to the sliding direction of the plunger. A suitable (mechanical, hydraulic or pneumatic) kinematic mechanism allows the motion to be properly transmitted from the actuator to the plunger. As it will be better seen in the description below, this arrangement allows the space taken up by the mechanism inside the housing of the section to be reduced.

The driving unit 1 is a part of a complete male mechanism that further comprises an upper cylinder 4, seen in FIG. 6, the driving unit 1 being coupled thereto. The upper cylinder 4 comprises a sliding seat for the plunger of the driving unit and means, for example cartridges not shown in the figures, for adjusting its travel. In the example of FIG. 6, the cylinder 4 is coupled to two driving units and therefore it has two seats for the two plungers. Then the cylinder 4 comprises means, for example screws, for fixing it to a base plate 22, described below, which acts as a support for the driving units. The cylinder 4 has also suitable centering seats which are housed on the upper part of the driving units, so as to guarantee them to be properly positioned.

The driving unit 1 comprises a frame 5 wherein the plunger 2 is slidingly mounted driven in a Z direction by the rod 3. A tool 7, called "punch" is mounted on the head 6 of the plunger 2, which is intended to be inserted in a blank mold for forming the blank of a glass container (the parison).

In the embodiment shown herein, the movement exerted on the rod 3 is generated by an electric actuator 2A.

In details, the electric actuator 2A comprises an electric motor 12 and a transmission for transmitting the movement from a shaft of the motor to the rod 3.

The electric motor 12 comprises a stator 8, a rotor 9 and preferably an angle position sensor 10 mounted in the frame 5 of the driving unit 1. Electric connectors 11a and 11b allow the motor 12 to be powered and controlled and the driving pulley 13 mounted on the output shaft of the rotor 9 to be put in motion.

A belt 17 placed on the driving pulley 13 and on the driven pulley 15, allows the rotational motion of the rotor 9 to be transferred from the pulley 13 to the pulley 15.

A worm screw 16, mounted on the driven pulley 15 rotates about its own Z axis due to the rotation transmitted from the belt 17 to the pulley 15.

A threaded sleeve 18, mounted on the worm screw 16 and fastened to the rod 3 of the plunger 2, transforms the rotational movement of the worm screw 16 into a linear movement of the rod 3, allowing the plunger 2 to move along the Z direction.

It has to be noted that the worm screw 16 is mounted substantially parallel to the axis of rotation of the electric motor, so as to optimize the space taken up inside the hollow glass forming machine.

The driving unit 1 then comprises means for feeding compressed air for the punch. The embodiments shown herein are about a "press-blow" production process and the compressed air is used for cooling the punch itself. In the case of a "blow-blow" production, an example not shown in the figures, the compressed air on the contrary is used for blowing the parison.

The frame 5 is closed at the bottom by a lower cover 19 that comprises a seat for a positioning pin 20 and one seat for a positioning ring 21. The pin 20 and the ring 21 are intended to be coupled to corresponding constraints (e.g. projecting seats or profiles) of a base plate 22 upon which the driving unit is supported; these constraints allow the driving unit 1 to be accurately placed on and aligned with the base plate 22.

The ring 21 surrounds one end of a telescopic rod 23 that forms a cooling channel for the plunger 2 and the punch 7.

The rod 23 comprises a first arm 24a integral with the positioning ring 21 and mounted on the cover 19.

The arm 24a is hollow and it defines an external cooling channel 25 wherein the other hollow arm 24b of the telescopic rod 23 is free to slide.

The end of the arm 24b opposite to the arm 24a is fastened to one end of the rod 3 of the plunger 2, so as to move together with it. The arm 24b defines an internal cooling channel 26 connected to the external one 25.

The external cooling channel 25 and the internal one 26 are in fluid communication with each other and the sealing is guaranteed by gaskets 27a and 27b.

During the assembly, the driving unit 1 is operatively connected at the cover 19 to a base 22, described better below, and supporting from the bottom the driving unit 1 and feeds it with a cooling fluid (preferably air), which, by entering from the positioning ring 21, moves towards the head 6 of the plunger 2 through the inside of the telescopic rod 23. Once the head of the plunger is reached, the air enters inside the hollow punch 7, cooling it, it enters inside the cylinder 4 and from here it goes again down towards the base plate following the path schematically shown by the arrows of FIG. 4.

The frame 5, although it is one piece, is ideally separable into two portions (or half-frames) extending for different lengths in the Z direction (the linear displacement direction of the plunger) from the shared cover 19. Each one of the two portions defines a respective chamber of the frame, which houses specific components. In detail, the half-frame more extended in the z direction houses the rod 3 of the plunger 2, while the less extended one houses the electric motor and the relevant electric terminals 11a, 11b. Therefore, as a whole, by partitioning the frame 5 with the XZ plane (orthogonal to the cover 19), the section is like having a L shape, as it can be noted in FIGS. 1 and 2.

As an alternative, the frame 5 may have a U shape, with two vertical half-frames of different length, housing the rod 3 of the plunger 2 and the motor 12 respectively, connected by a horizontal channel.

The fact of placing the electric motor and the rod of the plunger side by side allows the vertical space taken up to be reduced with respect to a similar solution wherein on the contrary the electric motor is mounted on the same axis as the rod 3.

The characteristic of a frame with different heights is at the same time particularly important for limiting the lateral space taken up, as it will be described soon, therefore allowing not only the vertical space but also the horizontal space to be reduced.

Moreover, this solution allows a particularly advantageous method for positioning the plungers to be carried out, described below with reference to FIGS. 7 to 15 for a IS machine with two driving units 1A and 1B, completely similar to the driving unit 1 just described.

The positioning method allows the driving units 1A, 1B to be positioned on a base plate 22 placed inside the housing of a section of the hollow glass forming machine. For simplicity and clarity reasons in the drawings, only the upper plane 28 of the machine housing is shown in the figures.

The base plate 22 is vertically movable and it is placed at the desired distance from the upper plane 28 by means of a height adjustment group 29, which translates it along the columns 31 acting as guides for the sliding of the base plate.

The upper plane 28 comprises a through seat for the passage of the driving units; such seat is used as the housing for a flange 30 to which the columns 31 are fixed; the flange 30 is then fastened on the plane 28 by means of screw adjustable connections.

The method for positioning the male mechanism according to the invention provides the combination of two distinct movements: a first linear translation of the driving unit along an axis substantially parallel to the axis of movement of the plunger, that is the above mentioned Z axis, till reaching a condition with the driving unit resting on the base 22 and a second linear translation of the driving unit along an axis substantially perpendicular to the axis of movement of the plunger, till reaching the operating position. From the operating point of view, an installer or maintenance man, who has to position the driving unit 1 on the plate 22, inserts the driving unit through the flange and the upper plane 28, till the half-frame holding the motor is completely under the plane 28, then the driving unit 1 is pushed laterally under the upper plane 28, such that the upper face of the half-frame holding the motor, for most part of it, and preferably completely, faces a lower face of the upper plane 28, such that, by looking at the machine from the top (namely by looking from the flange 30 towards the plate 22), such half-frame is partially, or completely, concealed from view.

FIGS. 7-10 show different steps for inserting a first driving unit 1A. This latter is passed vertically (substantially parallel to the Z axis as mentioned above) through the seat 30a of the plane 28 and the flange 30 (see FIGS. 7,8).

When the driving unit 1A rests (or substantially rests) on the base 22, it is moved to the side (perpendicularly to the Z axis) till one portion of it is directly under the plane 28 of the structure. In order to move the second driving unit 1B down into the housing, through the seat 30a, the first one 1A has to be kept in a position to the side.

FIGS. 11-15 show the subsequent insertion of a second driving unit 1B. Also in this case the driving unit is moved firstly by moving it down vertically along the Z axis till passing it into the seat of the plane 28 and flange 30 till resting on the base 22, and then, moving it to the side till arranging it into its operating position. This is obtained by inserting the pin 20 and the positioning ring 21 of the driving unit into suitable seats of the base plate 22.

Also in this case the half-frame holding the electric motor of the unit 1B is under the plane 28, while the half-frame holding the rod 3 of the plunger 2 of the unit 1B lies into the opening of the seat, so as to allow the machine to properly operate.

The electric terminals 11aB and 11bB of the second driving unit 1B are arranged to the side, towards the outside, and are oriented at 90° with respect to the terminals 11aA and 11bA of the first unit 1A.

Thus it is possible to correctly power the driving units 1A and 1B without the electric terminals generating an undesired amount of space or an interlacing of power lines, which is disadvantageous for the functional manufacturing and maintenance of the machine.

Once the second driving unit 1B is positioned, it is possible also to position the first driving unit 1A, by inserting the pin 20 and the ring 21 into the centering seats of the base plate 22.

The half-frame holding the electric motor is thus beneath the plane 28, while the half-frame holding the rod 3 of the plunger 2 lies in the opening of the seat 30a, so as to allow the machine to properly operate.

Once the base plate 22 is positioned, the electric terminals 11aA and 11bA are arranged laterally, towards the outside of the base plate, as it can be well seen in FIGS. 14 and 15.

In the case of a mechanism for a double-gob machine then it is possible to complete the installation of the male servo-mechanism by lowering the upper cylinder 4 on the two driving units 1A and 1B. Suitable centering seats allow the driving units and the cylinder to be perfectly aligned. The latter then has to be rigidly clamped to the base plate 22 by means of fixing means, for example screws 38a and 38d.

FIGS. 16 and 17 show the space arrangement of three driving units 1A, 1B, 1C of a triple-gob male servomechanism on a base plate 22A, having characteristics similar to those of the plate 22, except for the arrangement of constraints and channels for supporting and connecting three driving units.

The method for inserting the third unit 1C is similar to what described above, with the vertical insertion through the seat 30a and the following translation on the plate, therefore further reference is not made thereto. The only expedient, that has to be considered, is that the last inserted unit is always the first one to be inserted in the final position on the base plate, therefore in the above example the driving unit 1C. Then the other two units 1A and 1B can be inserted, which have been previously inserted and left temporarily in the lateral position, without being fixed.

The driving unit 1C is positioned such that the electric terminals −11aC, 11bC of the third unit 1C are arranged at 90° with respect to the terminals 11aA, 11bA of the first unit 1A, and at 180° with respect to the terminals 11aB, 11bB of the second unit 1B.

Figures 18, 19:
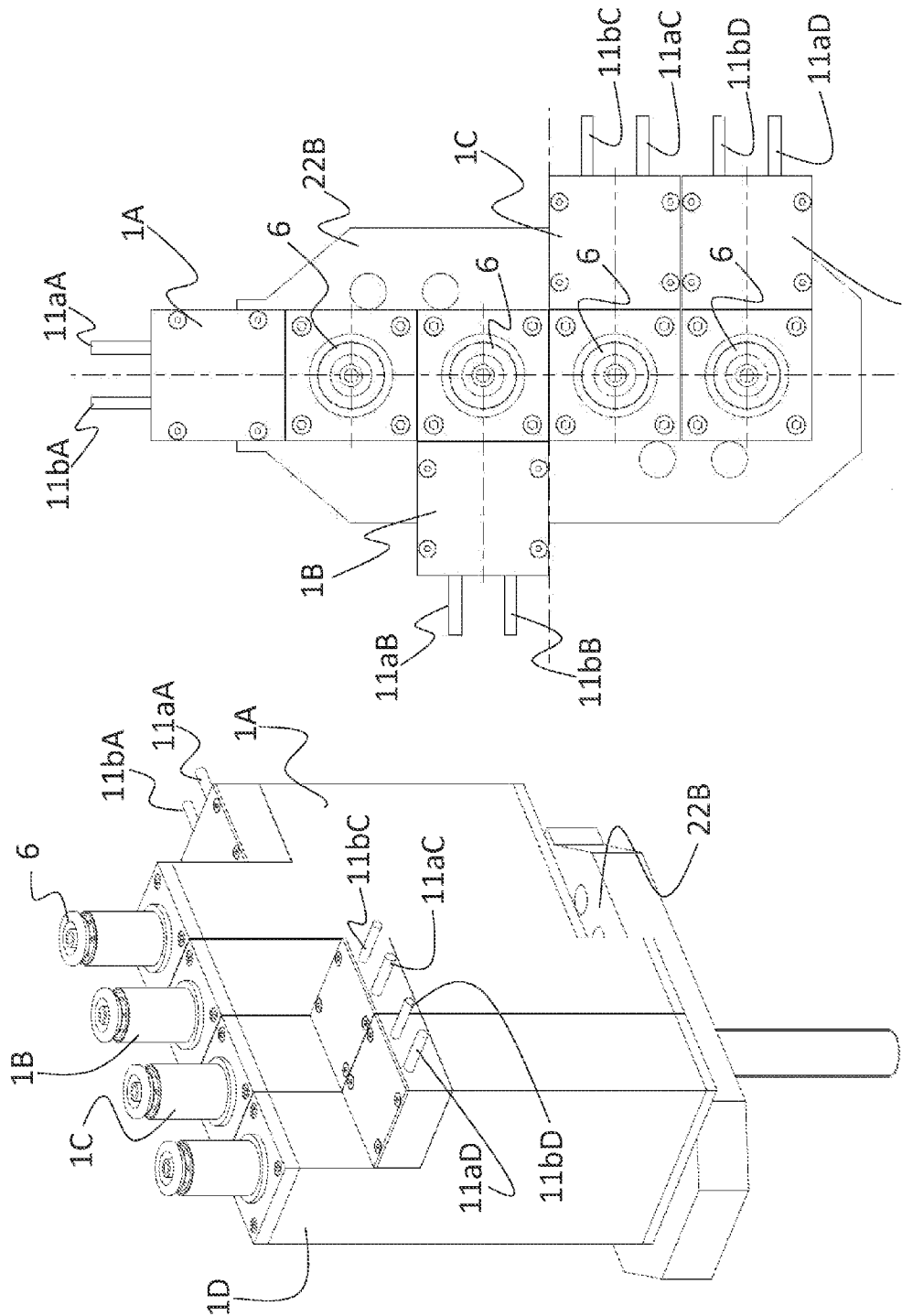
FIGS. 18 and 19 are the positioning of four driving units in a quadruple-gob variant of the machine of FIG. 6.
Figure 20:
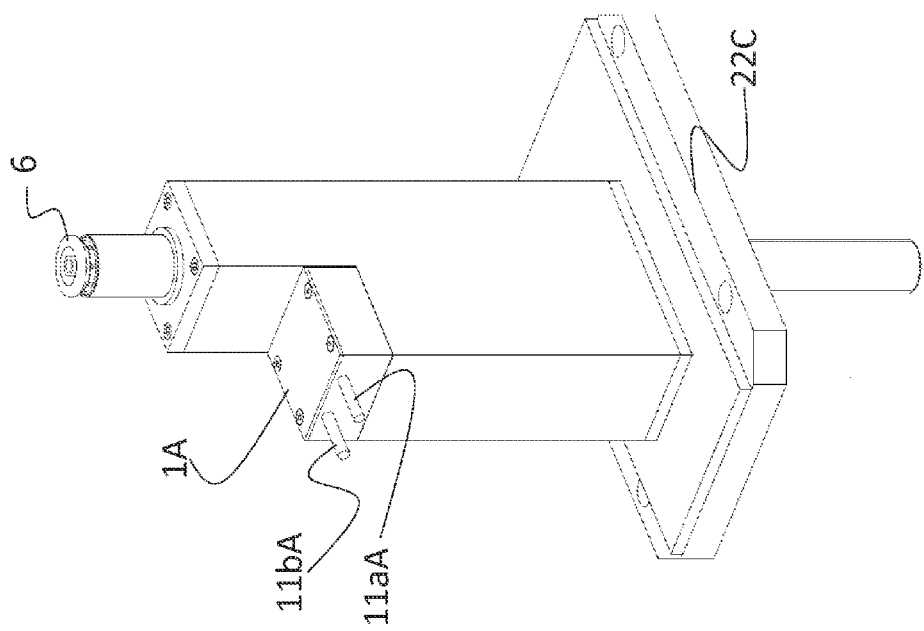
Figure 23:
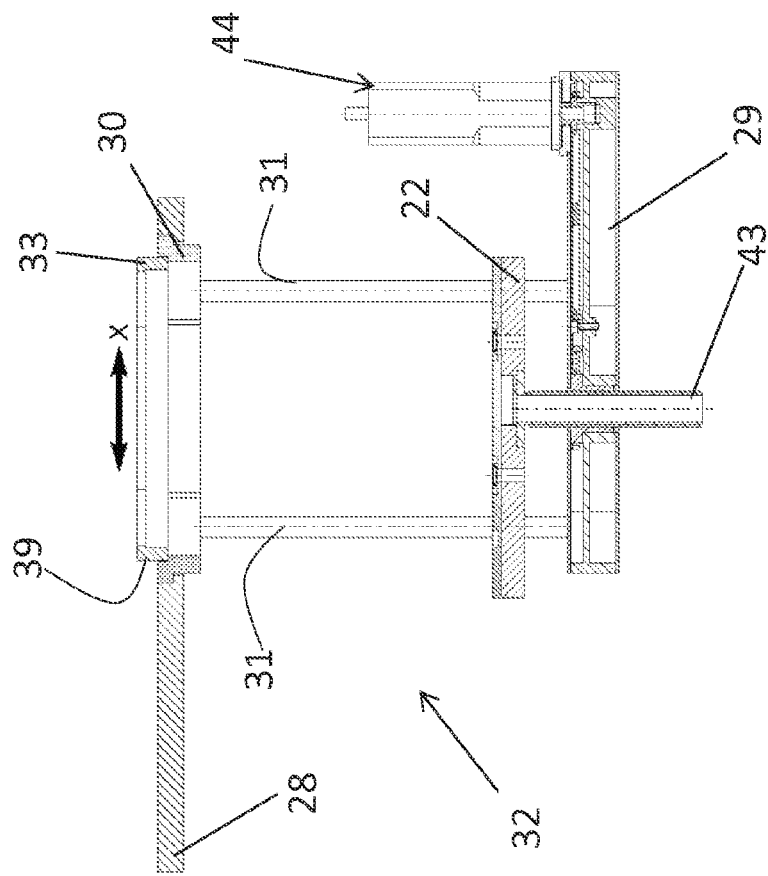
Figure 22:
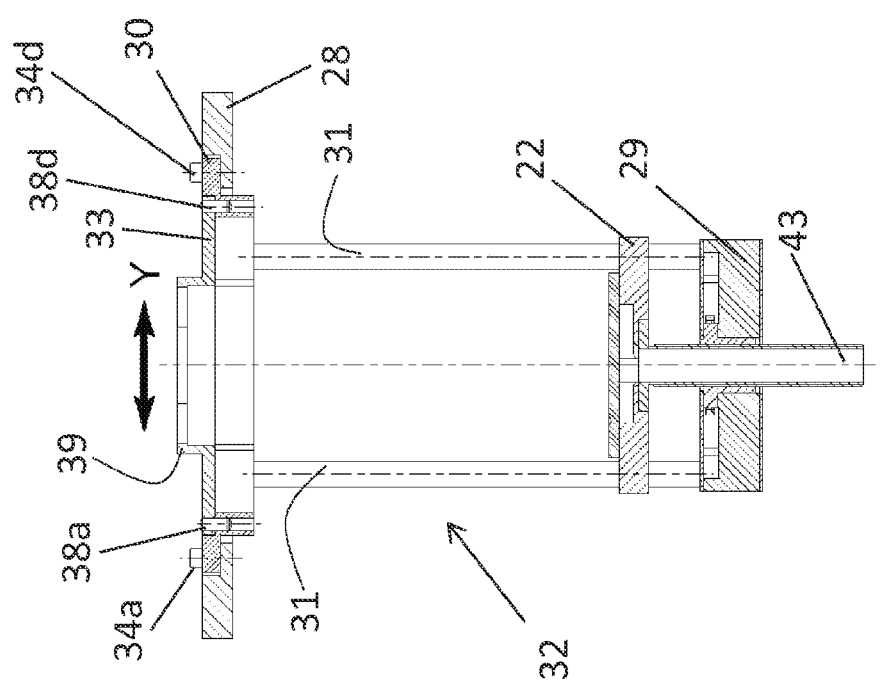

FIGS. 19 and 20 show the space arrangement of four driving units 1A, 1B, 1C, 1D of a quadruple-gob male servomechanism on the base plate 22B.

Even in this case the method for inserting the fourth unit 1D is similar to what described above and therefore reference is not further made thereto. The only expedient is that the last inserted unit, therefore 1D, has to be always the first one to be inserted in the final position on the base plate. Then it is possible to insert the other three units 1A, 1B and 1C, which have been previously inserted and kept temporarily in the lateral position, without being fixed.

The driving unit 1D is positioned with the electric terminals 11aD, 11bD parallel to those 11aC, 11bC of the third unit 1C.

Figure 21:
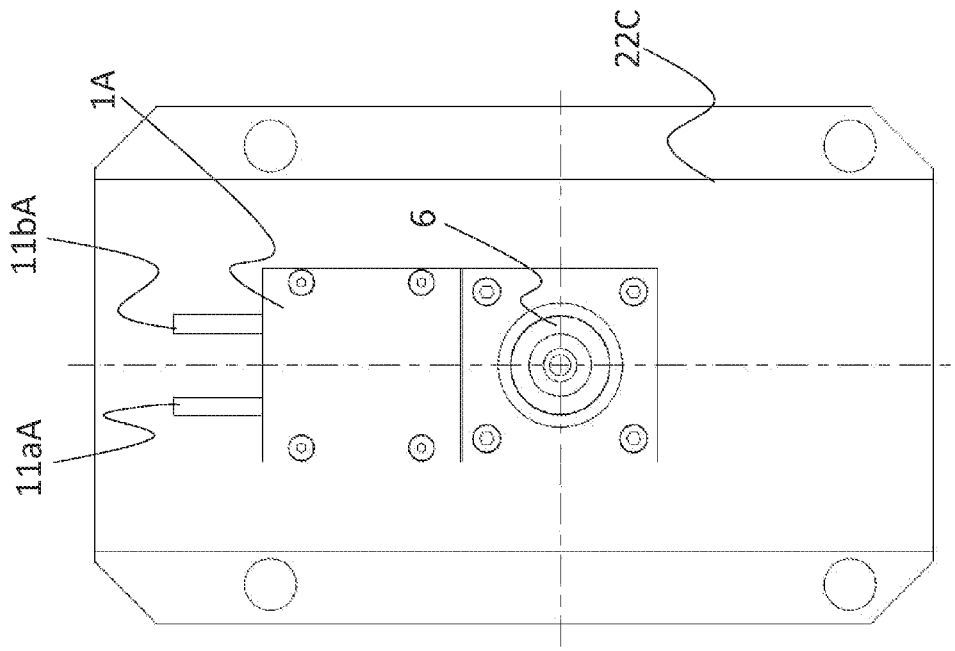
FIGS. 20 and 21 are the positioning of a driving unit in a single-gob variant of the machine of FIG. 6.

In the case of a single-gob machine, wherein the male mechanism comprises a single driving unit provided with a single plunger, this latter is inserted in the housing according to the procedures described above. However, since no other driving units have to be positioned, it is possible to position the driving unit at the centre of the base plate 22C, without necessarily pushing the housing of the motor under the plane 28 of the housing. FIGS. 20 and 21 show the driving unit 1A of the single-gob machine supported on the relative base plate 22C.

FIGS. 22-25 show a system for positioning a male mechanism 32 that allows the method described above to be implemented for positioning driving units, and the respective plungers, in the blank station of a hollow glass forming machine.

The height adjustment and supporting system for the male mechanism 32 comprises a base plate 22 that supports and moves the driving units 1 (in this embodiment two, but they could be in any number) and a height adjustment group 29 intended to drive the base 22.

The height adjustment and supporting system 32 further comprises an external flange 30 and an internal flange 33. The flange 30 is fixed to the upper plane 28 of a section of a IS machine, while the flange 33 is fixed to the flange 30.

The positioning system 32 according to the invention further comprises also one or more guide and support elements, particularly cylindrical guides 31, that will be better described soon.

The external flange 30 and the internal one 33 are shaped such that the first one 30 rests only on the plane 28 while the second one 33 rests only on the first one and not on the plane 28. The two flanges 30 and 33 therefore are made such that the external one 30 is on the whole more extended in the plan view than the internal one 33.

The external flange 30, in particular, is coupled with the plane 28 of the structure by means of screw coupling members, such as for example four screws 34a,34b,34c,34d. The plane 28 therefore has threaded seats wherein screws 34a-34d can be inserted, these seats have a size slightly greater than that of the shaft of the screws; this guarantees that it is possible to slightly move the flange 30 on a plane parallel to the upper plane 28 upon which it rests, so as to centre the male mechanism on the blank molds. Once the proper positioning of the male mechanism is obtained it is then possible to fix the external flange 30, and consequently the internal flange 33, on the plane 28.

The external flange 30 comprises a hollow shaped central portion, intended to receive the internal flange 33 and therefore it develops in a substantially annular manner about such hollow central portion. The edge of the hollow central portion of the flange 30 is shaped and has seats 35, 36 provided with positioning pins 37a and 37b.

The internal flange 33 is coupled to the external flange 30 by means of screw coupling members, such as for example four screws 38a, 38b,38c, 38d.

The internal flange 33 comprises, in this embodiment, a hollow central portion surrounded by a raised annular collar 39, that serves for housing and positioning the cylinder 4 and two flaps 40a, 40b rigidly constrained to the collar 39 or as one piece thereto.

The flaps 40a and 40b comprise each one a through hole (41a, 41b) intended to be centered on a respective pin 37a and 37b of the external flange 30.

The double flange system described above, therefore allows the plunger assembly to be centered with respect to the blank molds by moving in the X and Y directions, that is movements occurring on the plane where the external flange 30 lies, or more generally on a plane substantially parallel to the plane 28 of the structure of the section of the IS machine, the entire height adjustment and supporting system for the male mechanism, including the mechanism fitted on the supporting system.

Four guides 31 are fastened to the lower surface of the flange 30 at their upper part, and with their lower part they support the height adjustment system 29, by making it integral with and perfectly aligned with the flange 30.

The base plate 22 is mounted so as to slide on the guides 31 and it rests on the height adjustment group 29 fastened on the bars 31 at the end opposite to the flange 30. Therefore the adjustment group is suspended to the plane 28 of the housing and it supports the base plate 22.

The height adjustment group 29, comprises an adjustment screw 43 and a motor 44 (in this example an electric one) that drives the screw by a transmission kinematic chain (for example gears or a toothed belt or a chain).

The adjustment group 29 is suspended on the bars 31, in a position stationary with respect thereto, the bars 31 and the group 29 being integral one with the other (for example screwed, as one piece or anyway rigidly coupled).

Therefore when one desires to move the support base 22 for moving the driving units 11, supported thereby, towards the flanges 30 and 33, the motor 44 is operated, which rotates the screw 43 that in turn acts on a threaded collar and it raises or lowers the base 22 and, therefore, the units 1 supported thereby.

The machining of all the parts is such to guarantee the perfect perpendicularity of the bars 31 with respect to the plane of the flange 30, and therefore with respect to the upper plane 28 of the housing. Thus the perfect parallelism of the plane of the base plate 22 with the plane of the flange 30 and with the plane of the upper plate 28 of the housing is guaranteed, along all the range of vertical movement of the base plate.

It results a better verticality of the male mechanism than in the prior art, where its lower base remained aligned with the bottom of the housing, while its upper part was aligned on the blank molds. Therefore the male mechanism was never perfectly vertical.

This solution allows all the height adjustment and supporting assembly for the male 32 to follow the male mechanism during its small movements along the X and Y axes made by it when it is aligned with the blank molds. This always guarantees the perfect verticality of the male mechanism, all the group being constrained to the upper plane 28 of the housing, to which also the blank molds are referred, and not more constrained to two separated elements, as in the prior art.

The fixing in position of the assembly 32 and of the male mechanism mounted therein, once the proper alignment position is reached, is obtained by acting on the screw coupling members.

As it is easy to understand this solution is a synergy of advantages if a machine for the production of hollow glass is used. Even in case of need of performing maintenance operations on the male mechanism, in order to access the units 1, it is sufficient to remove the internal flange 33, and to take out the unit 1 that has to be maintained or replaced.

The disassembly of the internal flange 33 does not affect the alignment conditions obtained during the assembly, since this position is guaranteed by the screws 34a, 34b, 34c, 34d that are not unscrewed during the operation. After placing the driving units 1 again in position on the assembly 32, the internal flange 33 is placed again by using the centering systems provided on the external flange 30, which has never been moved, and therefore it is placed automatically again in the same position it had before being disassembled, guaranteeing again the alignment of the male mechanism on the blank molds without repeating the alignment operation.

From the description above it results therefore clear how the positioning system and method described allow the objects of the present invention to be achieved.

It is also clear that many variants can be made to the solutions described above without departing from the scope of the present invention as defined in the annexed claims.

For instance, it being valid the principle of arranging the plungers on a movable plate able to translate in a direction orthogonal to the lying plane of a flange that allows the plungers to be horizontally centered with respect to the molds, instead of four guides it is possible to use a different number of them, for example one or two.

According to a variant, even if less advantageous than the one described above, the adjustment group 29 can be fixed to the upper plane 28 by means different than those guiding the base plate.

The invention claimed is:

1. System for supporting and adjusting the height of a male mechanism in a section of a hollow glass forming machine, comprising:
    an external flange that comprises a resting face intended to stand at least in part on an upper plane of a housing of said section, and fixing means for fixing the external flange to said upper plane,
    an internal flange for retaining and guiding in position the male mechanism,
    means for fixing and centering the internal flange to the external flange,
    a vertically movable base plate for supporting and positioning the male mechanism,
    a height adjustment group intended to adjust the height of the base plate within said housing,
    wherein the vertically movable base plate rests on said height adjustment group, and
    wherein the vertically movable base plate is slidingly mounted on at least one guide rigidly fixed to the resting face of the external flange and adapted to allow the vertically movable base plate to slide along a sliding direction substantially orthogonal to said upper plane wherein the external flange lies,
    and wherein said height adjustment group is suspended to said upper plane and said height adjustment group is adapted to move the vertically movable base plate along said at least one guide.

2. System according to claim 1, wherein the height adjustment group is fixed to an end of said at least one guide, so as to be suspended to said upper plane by means of said at least one guide.

3. System according to claim 1 or 2, wherein the male mechanism comprises an upper cylinder wherein at least one plunger is adapted to slide,
    wherein the external flange comprises a central hollow shaped portion, adapted to receive the internal flange and wherein the internal flange comprises a central hollow portion surrounded by an annular, raised, collar, for housing and positioning the upper cylinder.

4. System according to claim 3, wherein the male mechanism comprises at least one driving unit for said at least one plunger, said at least one driving unit comprising a frame wherein a rod driving the plunger and an actuator adapted to allow the plunger to move are arranged side by side, wherein the central hollow shaped portion of the external flange has a passage opening such to allow the driving unit to pass and wherein the central hollow shaped portion of the internal flange has a passage opening such to prevent the driving unit itself from passing.

5. System according to claim 4, wherein said actuator comprises an electric motor and a transmission for transmitting a movement to the rod, said rod being substantially parallel to an axis of rotation of the electric motor.

6. System according to claim 4, wherein said frame is divided into two half-frames that extend in a direction of linear displacement of said plunger one first half-frame being more extended in said direction and adapted to house said rod of the plunger, and a second half-frame being less extended than the first one and intended to house the actuator of the plunger.

7. System according to claim 6, wherein the vertically movable base plate provides constraints, in particular pins and/or pegs and/or positioning holes, for positioning said at least one driving unit, said constraints being placed in such a way that the half-frame that houses the electric motor is positioned with a face facing at least partially, and for more than one half of its surface, a face of said upper plane.

8. System according to claim 7, wherein the vertically movable base plate comprises constraints for positioning at least two driving units, and wherein said constraints are such to position the frames of said at least two driving units in different directions.

9. System according to claim 7, wherein the vertically movable base plate comprises constraints for positioning at least three driving units, said constraints being intended to position a first unit according to a first direction, a second unit according to a second direction orthogonal to the first direction, and a third unit according to a third direction perpendicular with respect to said first direction and at 180° with respect to said second direction.

10. System according to claim 9, wherein said vertically movable base plate comprises constraints for positioning four driving units, said constraints being adapted to position a fourth unit on the base plate according to a fourth direction parallel with respect to said third direction.

11. System according to claim 1,
    wherein the height adjustment group comprises an adjustment screw and a motor coupled to said adjustment screw for controlling the position of the screw, and wherein the vertically movable base plate rests on the head of the screw.

12. Machine for the production of hollow glass, comprising a blank station and a finishing station wherein a parison and a finished glass container are formed respectively, wherein said blank station comprises
- a housing with an upper plane, and
- a male mechanism, wherein the male mechanism comprises a driving unit for a plunger, said driving unit comprising a rod of said plunger and an actuator adapted to allow the plunger to move, the machine further comprising a system for supporting and adjusting the height of the male mechanism according to claim 1 or 2.

* * * * *